United States Patent [19]

Smeaton

[11] 4,076,413
[45] Feb. 28, 1978

[54] APPARATUS AND METHOD FOR PRODUCING COLORED REPRODUCTIONS OF BLACK AND WHITE NEGATIVES

[75] Inventor: John Ronald Smeaton, Middlesbrough, England

[73] Assignee: Tioxide Group Limited, Billingham, England

[21] Appl. No.: 669,758

[22] Filed: Mar. 24, 1976

[30] Foreign Application Priority Data

May 8, 1975 United Kingdom ............... 19347/75

[51] Int. Cl.² ...................... G03B 27/32; G03B 27/52
[52] U.S. Cl. ...................................... 355/32; 354/80; 355/39; 355/63; 355/77
[58] Field of Search .................... 355/32, 39, 43, 45, 355/63, 77, 71, 27, 62, 21; 354/100, 103, 80, 152, 292, 75

[56] References Cited

U.S. PATENT DOCUMENTS

| 2,813,456 | 11/1957 | Ostrov ................................. 355/21 |
| 2,933,012 | 4/1960 | Church ................................. 355/21 |
| 3,060,796 | 10/1962 | Muse, Jr. ............................. 355/71 |
| 3,065,667 | 11/1962 | Edgerton ............................. 355/27 |
| 3,286,589 | 11/1966 | Glidden .............................. 355/21 |
| 3,352,221 | 11/1967 | Barron et al. ....................... 354/75 |
| 3,453,943 | 7/1969 | Newcomb ........................... 355/21 X |
| 3,519,345 | 7/1970 | Mercure et al. ..................... 355/21 X |
| 3,645,620 | 2/1972 | Jaffe .................................... 355/63 |
| 3,689,148 | 9/1972 | Black .................................. 355/39 X |
| 3,890,044 | 6/1975 | Feren .................................. 354/80 X |
| 4,003,653 | 1/1977 | Kelly .................................. 355/32 X |

Primary Examiner—Richard A. Wintercorn
Attorney, Agent, or Firm—Schuyler, Birch, Swindler, McKie & Beckett

[57] ABSTRACT

Apparatus for use in the production of a colored photographic reproduction of a black and white negative which consists essentially of a light-free enclosure, a baffle having an aperture and extending across the housing with means to mount the black and white negative over the aperture, means to carry one or more colored filters and means to generate a pulse of light to illuminate the negative in order that a copy may be taken by a camera suitably mounted.

13 Claims, 1 Drawing Figure

U.S. Patent
Feb. 28, 1978
4,076,413
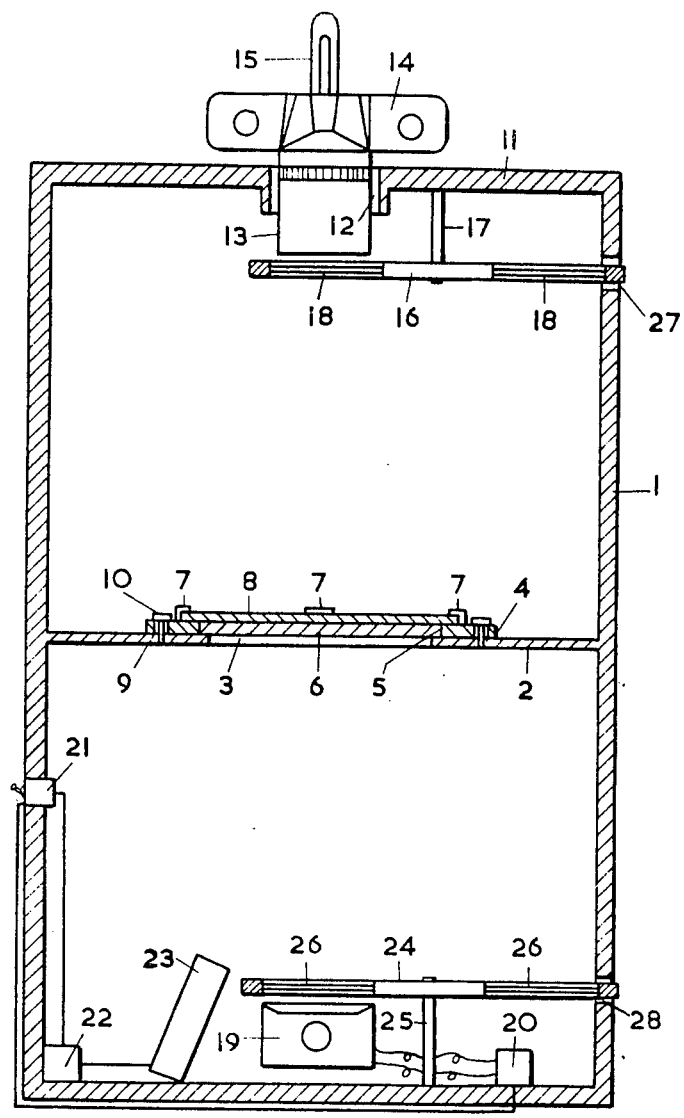

APPARATUS AND METHOD FOR PRODUCING COLORED REPRODUCTIONS OF BLACK AND WHITE NEGATIVES

This invention relates to apparatus suitable for use in the production of coloured photographic reproductions of black and white negatives and is particularly useful for the production of coloured photographic slides.

According to the present invention apparatus for use in the production of coloured photographic reproductions of black and white negatives comprises a housing providing when closed a substantially light-free enclosure, a baffle member extending across the housing and having an aperture and means to mount a black and white negative across the aperture, means to mount a camera outside the housing with the plane of the camera lens mounted substantially parallel to the plane of the aperture of the baffle member, means to generate a pulse of light of known time and intensity to illuminate the aperture on the side of the baffle member remote from the camera when mounted and means to carry one or more coloured filters mounted between the means to generate a pulse of light and the camera when mounted.

The present invention is apparatus which is particularly suitable for use in the production of coloured photographic reproductions of black and white negatives. The apparatus is particularly useful for the production of a coloured reproduction in the form of a slide. Essentially the apparatus consists of a housing, usually a box-like member which provides when closed a substantially light-free enclosure. By substantially light-free there is to be understood that the housing does not necessarily need to be completely light-tight, but any light that does enter should not be of sufficient intensity to affect the film in the camera when exposed.

It has been found not to be necessary to seal in a light-tight manner each and every opening of the housing, for instance, it is not necessary to provide an absolute light-tight seal between the camera and the housing. However, normally the housing will have a matt black interior to reduce reflective light from the walls of the housing.

When the housing is a box-like member then the housing can be provided with two doors through which access may be gained to the upper and lower portions of the housing to enable the black and white negative to be positioned within the housing and to the means to generate a pulse of light in the lower half of the housing.

The housing is provided with a baffle member extending across the housing and the baffle has an aperture usually located about its mid-point. The baffle member is provided with means to mount a suitable black and white negative and such means may conveniently be an opalescent glass plate on the upper surface of which the negative is placed and retained in position by a cover slip of clear glass retained by appropriately positioned lugs. In the most preferred form of the apparatus the means to mount the negative over the aperture is a circular plate member having a central aperture usually of square or rectangular shape provided with an opalescent glass plate and over which the cover glass and negative are mounted. The circular plate is preferably provided with a number of arcuate slots each provided with a locating peg which retains the plate in close proximity to the baffle member but which permits the plate to be rotated about its central point to permit exact positioning of the negative in relation to the camera lens.

The housing is provided with means to permit a camera to be mounted so that the camera lens is separated from the negative by substantially the distance required to view the negative so that it appears to fill the camera viewing screen. In the most convenient construction when the apparatus is a box-like member the camera is mounted on the upper surface of the box-like member with the lens extending through an aperture into the box-like member and the camera may be retained rigidly in position by employing a mounting bracket screwably locating the tripod mounting fitting of the camera. An extension ring is usually required between camera body and lens because of the relatively close proximity of the camera to the negative. The apparatus of the present invention is particularly useful when the camera to be employed is a 35 mm single-lens-reflex camera since this allows the negative to be copied, to be viewed and accurate focussing to be achieved most easily.

The housing includes means to generate a pulse of light of known time and intensity to illuminate the negative to be copied. Suitable means is an electronic flash unit mounted on the side of the negative remote from the camera so that the light is transmitted through the negative on to the photographic film within the camera.

The housing includes means to carry one or more coloured filters in order that the appropriate coloured light may be received by the camera. The filter may be mounted either between the light generation means and the negative or between the negative and the camera lens, or if desired, two filters may be included of the appropriate colour one on each side of the negative. The most preferred means to carry the filter is a circular disc mounted to be rotatable about its central vertical axis at right angles to the plane of the disc and carrying a number of coloured filters. The disc is mounted so that on rotation of the disc the appropriate filter is moved into line with the negative and the lens of the camera. Preferably the disc is mounted between the camera lens and the negative to be copied. In addition to the coloured filters the rotatable disc may contain opaque discs and a clear glass disc.

If desired, the housing may also contain an additional light source to illuminate the negative to enable the focussing of the camera to be achieved prior to actual photography taking place. This additional light source is switched off during actual exposure of the negative using the flash unit.

One form of apparatus constructed in accordance with the present invention will now be described by way of Example only and with reference to the accompanying drawing which is a diagrammatic part-section of the apparatus.

The apparatus includes a housing 1 formed of wood or metal in the form of a box-like member having a matt-black light-absorbant interior surface. A baffle member 2 extends across the housing 1 and has a central rectangular aperture 3 over which is positioned a circular metal plate 4. The circular plate 4 has a central rectangular aperture 5 carrying an opalescent glass plate 6 covering the aperture 3 in the baffle member 2.

Three locating lugs 7 are provided on the circular plate 4 to locate a clear glass cover plate 8. The circular plate 4 is provided with four arcuate slots 9 each provided with a locating pin 10 secured to the baffle member 4. Slight rotational movement of the circular plate 4 is thus possible to permit accurate positioning.

The top 11 of the housing 1 has a central aperture 12 of a size sufficient to enclose the lens 13 of a 35 mm single-lens-reflex camera 14 mounted by means of a slotted bar 15.

A circular rotatable filter holder 16 is mounted on a support 17 depending from the top of the housing 1. The filter holder 16 is provided with a number of filters 18, positioned so that on rotation of the holder 16, a particular filter 18, may be positioned under the lens 13 of the camera 14.

Within the base of the housing 1 there is mounted a flash unit 19 connected to a transformer 20 and to a suitable supply of electricity through a 3-way switch 21. The 3-way switch 21 also provides a switchable source of electrical power to another transformer 22 and to an inspection lamp 23.

The second circular rotatable filter holder 24 is mounted on a shaft 25 within the base of the housing 1. The filter holder 24 is provided with a number of filters 26 positioned so that on rotation of the holder 24, a particular filter 26, may be positioned immediately above the flash unit 19. The extreme peripheries of the filter holders 18 and 24 extend through the housing 1 via slots 27 and 28 and by appropriate marking of the peripheral surfaces of the filter holders 18 and 24 the colour of the filter 18 or 26 adjacent lens 13 or flash unit 19 may be seen from outside the housing 1.

The housing 1 is provided with two inspection doors (not shown). The upper door hingedly locates along the baffle member 2 to permit access to the upper half of the housing and the lower inspection door is hingedly located along the base of the housing to permit inspection of the lower half of the housing 1.

One method of employing the apparatus as shown in the accompanying diagram for the production of a colour transparency from black and white negative will now be described. The black and white negative may be, for example, prepared from a diagram in black on a white (transparent) background. The negative will have the diagram in white on a black background. Usually it is convenient for the negative to have a size of approximately 5 inches by 4 inches and this is positioned over the opalescent glass plate 6 and retained in position by the clear glass cover plate 8. The switch 21 is actuated to illuminate the lower surface of the opalescent glass plate 6 by means of the inspection lamp 23 and the camera lens focussed on the negative. The camera contains a colour film suitable for the production of colour transparencies, and suitable for the light source used for making the exposure.

The upper rotatable filter holder 16 is rotated until a red filter is positioned immediately below the camera lens. If desired a similar colour filter 26 may be positioned immediately above the flash unit 19 by rotation of the filter holder 24. The shutter of the camera is opened and held in the open position whilst the electronic flash unit 19 is energised by operation of switch 21 to expose the film in the camera for the desired time. The upper rotatable filter holder 16 is then rotated so that an opaque disc is positioned immediately below the camera lens and thus acting as a light baffle. The camera shutter is allowed to remain open and the negative removed from above the opalescent glass plate 6. A green filter 18 is then positioned immediately below the camera lens 13 and the film in the camera again exposed by means of the electronic flash unit 19 being energised by operation of switch 21. The camera shutter is then closed.

The first exposure of the film in the camera produces a red image of the white portion of the negative and the second exposure produces a green image on the camera film of the remaining portion of the negative. On developing the particular frame of the colour film so exposed a yellow on green coloured transparency will be produced. (Red and green light combined give the yellow image.)

Various combinations of coloured transparencies can be obtained by the method of the present invention from black and white negatives. The method is of particular use in the production of yellow diagrams on green backgrounds, white diagrams on red, green or blue backgrounds and magenta diagrams on blue backgrounds. Other combinations are :

Cyan diagram on green background
White diagram on magenta background
Red diagram on black background
Green diagram on black background
Blue diagram on black background
Yellow diagram on black background
Magenta diagram on black background
Cyan diagram on black background A modification is a clip-on-attachment which is housed over the negative carrier. Its prime function is to enable one to produce two different colours on a coloured background, without an elaborate masking technique being necessary.

The modification consists of three or more coloured filter strips of, for instance one centimeter wide, placed just above the plane of the negative. The filters are also rotatable about a horizontal axis. The filters can also be moved independently across the surface of the negative. If, therefore, a line of words are required in a different colour (e.g.) yellow on a green background, it is only necessary to position one of these filters over the words during the first exposure. This first exposure would then give white and red images simultaneously. The object of the filters rotating about a horizontal axis is to enable the same filter to be used for different letter points. When viewed from camera position, rotation would appear to narrow or broaden the filter.

When the black and white negative has the form of black lettering and/or diagrams on a transparent background, then it is possible to obtain such black lettering and/or diagrams on cyan, yellow, magenta, red, green or blue backgrounds using one single exposure.

What is claimed is:

1. Apparatus for producing colored photographic reproductions of black and white negatives, said apparatus comprising:
   a housing providing when closed a substantially light-free enclosure;
   said housing having an aperture for receiving a camera lens therethrough;
   means for mounting a camera outside said housing with the camera lens extending through said lens receiving aperture into said housing;
   a baffle member disposed in the interior of said housing spaced from the lens receiving aperture and extending across the housing;
   an aperture in said baffle member and means for mounting a black and white negative across said baffle aperture with the plane of the negative substantially parallel to the plane of the lens of a camera mounted on said camera mounting means;

means for generating a pulse of light of known time and intensity to illuminate the baffle aperture on the side of the baffle member remote from the lens receiving aperture; and means for positioning at least one colored filter between the light pulse generating means and the camera lens receiving aperture.

2. Apparatus according to claim 1 in which the means to mount a black and white negative is an opalescent glass plate carried by a circular plate member and mounted over a central aperture with said circular plate member being positioned over the aperture in said baffle member.

3. Apparatus according to claim 2 in which the circular plate member has a number of arcuate slots, each slot locating a pin secured to said baffle member.

4. Apparatus according to claim 1 in which the means to generate a pulse of light is an electronic flash unit.

5. Apparatus according to claim 1 in which the means to carry one or more coloured filters is a circular disc mounted to be rotatable about its central vertical axis at right angles to the plane of the disc and carrying a number of coloured filters.

6. Apparatus according to claim 5 in which the circular disc is positioned between the camera when mounted and the baffle member.

7. Apparatus according to claim 6 in which an additional circular disc carrying a number of coloured filters is mounted between the baffle member and the means to generate a pulse of light.

8. Apparatus according to claim 1 in which the housing is a box-like member having doors to provide access to the upper and lower portions of the box-like member.

9. Apparatus according to claim 1 in which the housing has a matt-black interior surface.

10. Apparatus according to claim 1 in combination with a 35 mm camera.

11. Apparatus for producing colored photographic reproductions of black and white negatives, said apparatus comprising:

a housing providing when closed a substantially light-free enclosure;

said housing having an aperture for receiving a camera lens therethrough;

means for mounting a camera outside said housing with the camera lens extending through said lens receiving aperture into said housing;

a baffle member disposed in the interior of said housing spaced from the lens receiving aperture and extending across the housing;

an aperture in the said baffle and means for mounting a black and white negative across said baffle aperture with the plane of the negative substantially parallel to the plane of the lens of a camera mounted on said camera mounting means;

means for generating a pulse of light of known time and intensity to illuminate the baffle aperture on the side of the baffle member remote from the camera lens receiving aperture;

means bearing a plurality of colored filters rotatably mounted in said housing between the light pulse generating means and the camera lens receiving aperture; and means extending through the said housing for rotating said filter bearing means to selectively position a desired one of said filters between the light pulse generating means and the lens receiving aperture.

12. Apparatus as recited in claim 11 wherein said filter bearing means comprises a circular disk and said means for rotating said filter bearing means comprises a portion of the periphery of said disk extending through a slot in the housing.

13. A method for producing colored photographic reproductions of black and white negatives comprising the steps of:

providing apparatus comprising a housing providing a substantially light-free enclosure; a camera mounted on the outside of said housing with the camera lens received through an aperture in the housing wall, a baffle member disposed in the interior of the housing spaced from the camera lens, said baffle member having an aperture therethrough substantially parallel with the plane of the camera lens, means to generate a pulse of light of known time and intensity on the side of the baffle member remote from the camera lens and means for selectively positioning at least one of several colored filters between the light pulse generating means and the camera lens;

mounting a black and white negative across the baffle aperture;

providing a first pulse of light of known duration and intensity from the light pulse generating means to illuminate the negative and simultaneously exposing a color film in said camera through a first desired colored filter;

removing the negative from across the baffle aperture;

providing a second pulse of light of known duration and intensity from the light pulse generating means and simultaneously reexposing the said film in said camera over its entire surface through a second desired colored filter to produce a colored photographic reproduction of the black and white negative.

* * * * *